United States Patent [19]

Shupp et al.

[11] 4,155,563
[45] May 22, 1979

[54] APPARATUS FOR APPLYING HIGH TORQUE LEVELS

[75] Inventors: Jack K. Shupp, East Berlin; Eugene K. Abel, York, both of Pa.

[73] Assignee: Flinchbaugh Products, Inc., Red Lion, Pa.

[21] Appl. No.: 766,741

[22] Filed: Feb. 8, 1977

[51] Int. Cl.² ............................................. B23B 5/34
[52] U.S. Cl. .................. 279/1 Q; 279/1 SJ; 279/46 R
[58] Field of Search ............ 279/19, 1 SJ, 4, 50, 279/46

[56] References Cited
U.S. PATENT DOCUMENTS

| | | | |
|---|---|---|---|
| 2,346,706 | 4/1944 | Stouer | 279/46 |
| 3,168,322 | 2/1965 | Dziedzic | 279/50 |
| 3,404,822 | 10/1968 | Green | 279/46 A |

Primary Examiner—Harold D. Whitehead
Attorney, Agent, or Firm—Pennie & Edmonds

[57] ABSTRACT

A novel collet and chuck are disclosed for applying high levels of torque to an article having substantially circular cross-sections about a common axis and sloping sides, such that it cannot be readily gripped by conventional chucks without marring the exterior surface of the article. A collet is provided which is reinforced against torsional distortion and which provides a rubber interior surface conforming to the article. Torque levels as high as 1700 inch-pounds may be applied to such articles, such as projectile shells, in accordance with the invention. Means are provided for rapidly releasing the article from the chuck after the torquing operation.

7 Claims, 3 Drawing Figures

APPARATUS FOR APPLYING HIGH TORQUE LEVELS

BACKGROUND OF THE INVENTION

1. Field of the Invention

Certain manufacturing operations require the application of high levels of torque, usually to tighten two elements threaded together in order to prevent them from unscrewing. If both of the articles to be torqued together have angular cross-sections, such as squares or hexagons, the torquing operation can be readily accomplished with wrenches or equivalent tools. If one or both of the elements to be torqued together are cylindrical, they can be held in conventional chucks capable of applying the requisite radial force without such slippage as would unacceptably mar the surfaces of the elements at the high torque levels required by some manufacturing specifications.

Where one of the elements to be joined, however, is generally circular in cross-section and has smoothly sloping sides, it is not susceptible to being held or rotated by any conventional machine tool element, particularly at extremely high torque levels, for example, up to and in excess of 1,000 inch-pounds.

The existence of such a problem is illustrated in the manufacture of projectile shells, in which the smooth-sided shell must be tightly joined by threads to its base in accordance with torque requirements high enough to prevent the two elements from becoming separated due to the spin imparted to the projectile when it is fired.

2. Description of the Prior Art

Various types of collet have previously been available for tightly gripping taper-shank machine tools, but applicants are not aware of such collets or chucks capable of reliably providing the high torque levels required for e.g. projectile manufacture, in a manufacturing operation, without gripping the article so forcefully as to mar its surface. For example, U.S. Pat. No. 2,995,832, Oct. 11, 1960 for a "Sleeve for Taper Shank Tools", discloses an essentially conical plastic sleeve for insertion between a correspondingly tapered tailstock or chuck, and a tool shank. Its function is to avoid any scoring of the mating metal surfaces, and to provide slippage between them under torsional shock. A metal insert in the tail end of the sleeve affords a surface for axially forcing it out of the tailstock, but it is neither capable of nor intended for imparting any rotational force to the chuck. The collet is not reinforced, and is plainly not capable of taking the torsional loads contemplated in accordance with the present invention.

U.S. Pat. Nos. 2,346,706 and 2,346,707, both issued Apr. 18, 1944 to the Jacobs Manufacturing Company, disclose versions of an adjustable chuck for holding tools with cylindrical shanks, and the U.S. Pat. No. 2,346,706 also indicates that the gripping edges provided by the chuck may alternatively be shaped to fit contours other than cylindrical ones. The collets of both patents involve the provision of a radial array of steel members held together by a rubber adhesive filler, and the interior surfaces of the steel members correspond to the cylindrical shank of the tool to be held in the collet. Both patents make it plain that all embodiments of the collet which they describe rely solely upon the metal elements, in contact with both the chuck and the workpiece, to hold the latter in place. For example, the specification of the U.S. Pat. No. 2,346,706 recites at column 2, lines 48-50, that "the inner, outer and front edges of the gripping members are exposed, that is, they are not covered by the resilient binder". This requirement of metal-to-metal contact is consistent with the requirement of a tool-holding collet that it precisely hold a tool shank without eccentricity or wobble.

Chucks employing resilient liners for other purposes, such as for tightening or removing bottle caps, are illustrated in U.S. Pat. Nos. 1,954,422 issued Apr. 10, 1934, and U.S. Pat. No. 2,449,161 issued Sept. 14, 1948, but they do not suggest any way of applying the requisite levels of torque to artillery shells or similarly shaped articles having extending sloping sides.

SUMMARY OF THE INVENTION

In accordance with the invention, a special reinforced collet is provided which contacts a large area of the article to be torqued with rubber or an equivalent resilient material that is hard enough to withstand the forces applied to it, yet not so hard as to mar the surface of the article in contact with it, such as a steeljawed chuck or collet would. The interior surface of the collet, which is to be in contact with and apply the requisite torque to the article, is made to conform to the particular shape of the article to be held, such as by molding it of rubber using such article, or a replica of it, as the male mold element.

A plurality of circumferentially distributed steel reinforcing members are molded or otherwise embedded in the deformable elastic body of the collet, such that they rigidify and reinforce it against torsional distortion at high torque loads. The exterior surfaces of the reinforcing members preferably extend beyond the exterior surface of the collet body to collectively define a conical camming surface, and each forms an interior bearing surface at its inner diameter substantially conforming to the adjacent interior surface of the collet body, for transmitting radial forces uniformly to the article being torqued.

A chuck is provided in accordance with the invention, including a camming member having a frusto-conical cam surface which cooperates with the camming surface defined by the collective reinforcing members of the collet, and which is held by an axially slideable cap member against rotation relative to the camming member.

When an article to be torqued, such as a projectile shell, is placed in the collet and forced axially toward the chuck, the collet and cap member slide axially with respect to the camming member, applying a large evenly distributed force radially inward to firmly grip the article. This permits the application of high torque levels either by rotating the chuck with the article in it and holding its mating part stationary, or by holding the article stationary in the chuck and rotating the mating part, which may be more readily gripped, all without undue slippage and without marring the surface of the article, such as would occur if it were held in metal-to-metal contact. Upon completion of the torquing operation, means are provided in accordance with the invention for positively displacing the collet out of the camming member to release the article from the chuck.

DESCRIPTION OF THE DRAWINGS

The invention will be further illustrated in accordance with specific preferred embodiments thereof as shown in the accompanying drawings, in which.

DESCRIPTION OF PREFERRED EMBODIMENTS OF THE INVENTION

Figure 1:
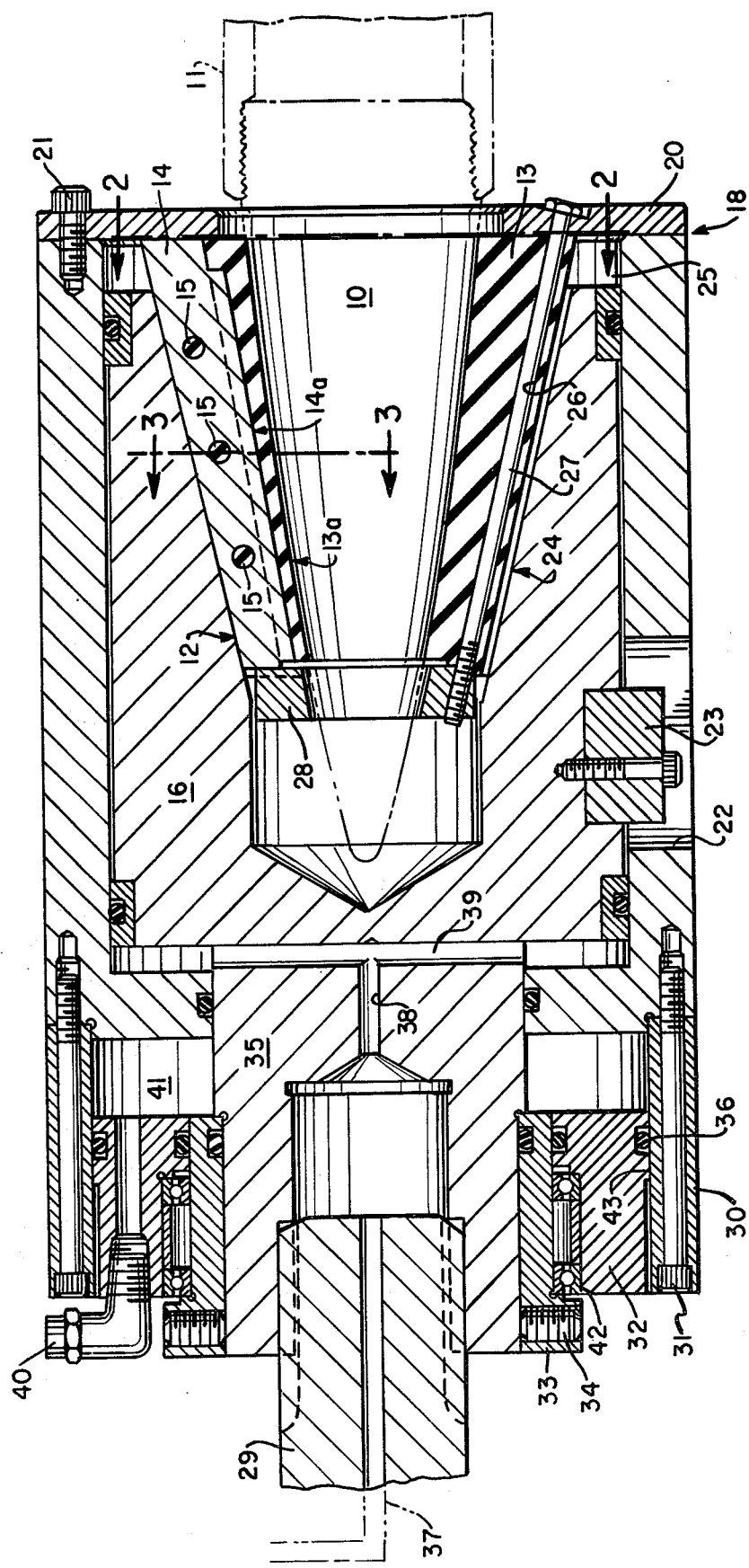
FIG. 1 is a longitudinal sectional view of a collet and chuck in accordance with the invention, taken along the line 1—1 of FIG. 2.
Figure 2:
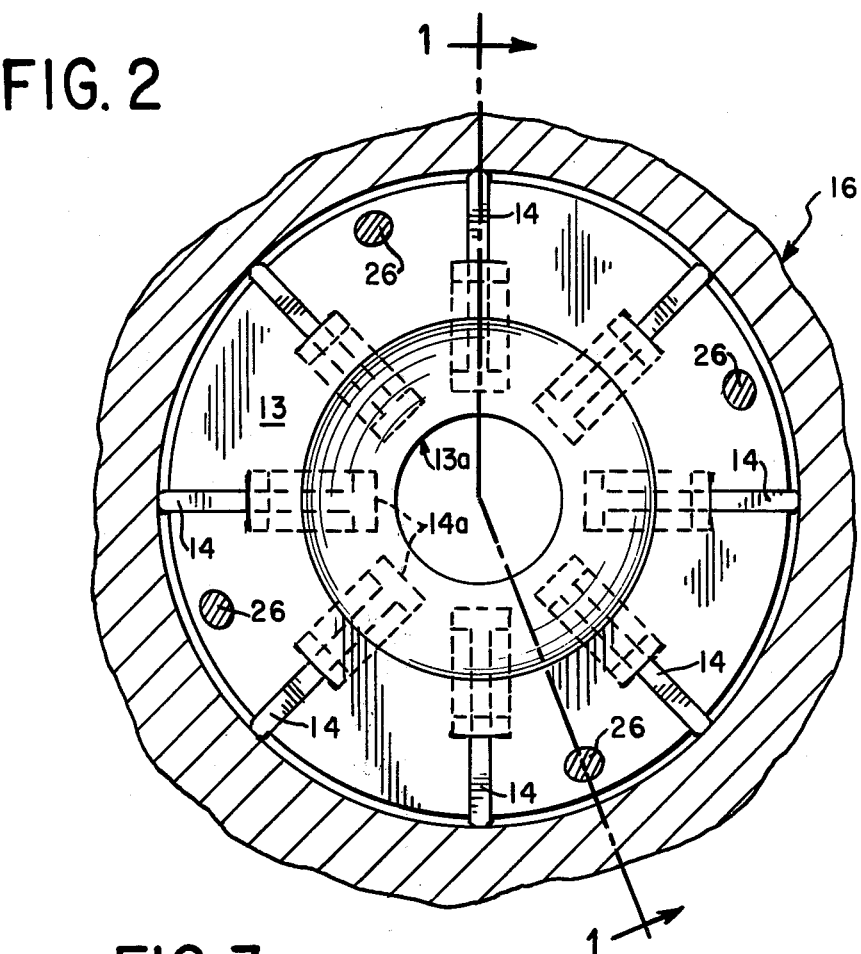
FIG. 2 is an end sectional view taken along the line 2—2 of FIG. 1.
Figure 3:
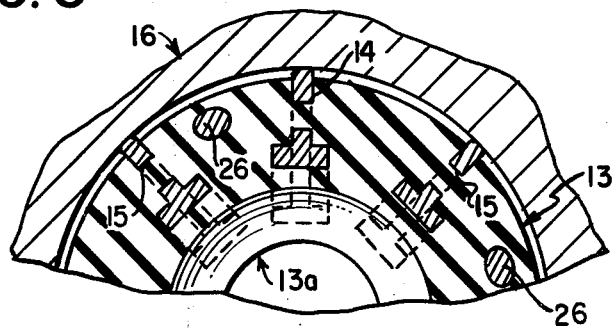
FIG. 3 is a partial sectional view taken along the line 3—3 of FIG. 1.

FIGS. 1, 2 and 3 collectively show a preferred embodiment of the invention as applied to the assembly of a projectile shell 10, schematically illustrated in phantomline, with its base 11, which is similarly shown. Specifications applicable to the assembly of such shells require in some cases torque levels up to 1,100 inch-pounds. For this purpose, a collet generally indicated as 12 is formed of a rubber collet body 13 and containing reinforcing members 14.

In accordance with the invention, the collet is preferably molded using the shell 10 or other article to be torqued, or its replica, as a male mold so as to define an interior surface conforming as closely as possible to such article. The collet body is preferably formed of any natural or equivalent artificial rubber or other material having the requisite strength, flexibility and resiliency. The invention is not susceptible of precise limitation with respect to these properties, inasmuch as a particular rubber may, for example, be adequate for the application of a specified torque level to an article having a particular shape and surface yet might not withstand higher torque levels, or even stresses encountered in applying the same torque levels to an article of a different curvature or having different surface properties. Broadly, rubbers with a Durometer "A" hardness, measured on the Shore "A" scale, between about 40 and about 95 are believed to be satisfactory for collet bodies in accordance with the invention. A particularly suitable rubber, for example, is sold under the trademark FLEXANE "94" by Devcon Corporation of Danvers, Massachusetts.

Generally, the harder rubbers are better able to stand the stresses of high torque loads without torsional distortion such as might damage the collet, or force the interior of the collet out of uniform contact with the article, causing slippage, and without undue wear. Flexane "94", for example, has a Shore "A" hardness of about 85.

The collet includes eight reinforcing members 14, T-shaped in cross-section, extending radially and longitudinally through the collet body. Preferably, the reinforcing members are made of hardened steel and are provided with a series of holes 15 through which the rubber flows, during molding, to form a unitary body with maximum structural integrity, particularly to prevent axial slippage between the collet body 13 and reinforcing members 14.

The exterior surface of reinforcing members 14 are preferably rounded or chamfered and extend slightly outwardly beyond the surface of body 13 enough to assure that the appropriate camming action between the collet and the chuck takes place without undue interference of the body portion.

The inner ends of the T-shaped reinforcing members 14 form interior bearing surfaces 14a substantially conforming to the adjacent interior surface 13a as illustrated in FIGS. 1 and 2. Enough depth in the collet body must be provided between the interior bearing surface 14a and the adjacent interior gripping surface 13a to allow the necessary cushioning and resiliency needed to grip the article, yet it must not be so deep as to leave a sizeable portion of the body without reinforcement inasmuch as this could lead to torsional distortion of the collet under high torque loads. For torquing an artillery shell about six inches in length and having a maximum diameter of about two and one-half inches, a collet has been satisfactorily employed having an average wall thickness of about ⅜ inch, with reinforcing members having their interior bearing surfaces spaced approximately ⅛ inch from the interior surface of the collet. The T-shaped inner heads of the reinforcing members may be planar, as shown; if desired they may be arcuate in conformity with the inner surface of the collet.

The chuck for holding and operating the collet in accordance with the invention includes a camming member 16 axially slideably mounted in cap member 18 comprised of an exterior body 19 and an annular end plate 20, attached to the housing by bolts 21. Housing 19 is provided with at least one or preferably two or more slots 22 which engage lugs 23 bolted to camming member 16, locking the housing and the camming member together against relative rotation while leaving them free to slide axially with respect to each other over at least a distance necessary to effect adequate camming action. Camming member 16 includes a frusto-conical camming surface 24 provided for this purpose, the angle of which corresponds to that formed by the collective reinforcing members of the collet, such that upon axial movement of the collet to the left with respect to camming member 16 as shown in FIG. 1, the collet body and particularly the reinforcing members are cammed radially inward. Note that a space 25 is left between the right side of the camming member and the opposing surface of end plate 20, permitting axial movement as described above adequate to obtain the necessary gripping action by the collet.

A series of generally longitudinal holes 26 is provided in the collet, through which extend bolts 27 anchoring the collet to end plate 20. The bolts are fastened to an annular steel retaining member 28. Holes 27 are preferably provided close to the outer diameter of the collet and spaced evenly between the reinforcing members so that they interfere minimally with the operation of the collet. They are not operative during the camming action, but serve only to draw the collet out of engagement with camming member 16 after the torquing operation.

The chuck is shown threaded to a spindle 29 for mounting on an appropriate driving motor capable of providing the necessary torque. Commercially available high torque air-driven motors designed to stall at the desired maximum torque level are particularly useful for this purpose.

Housing 19 includes at its left end (as shown in FIG. 1) an unlocking mechanism comprising an outer cylindrical wall 30 fastened by bolts 31 to the housing, within which is slideably provided an intermediate annular closure member 32, and an inner closure member 33 secured by lock-bolts 34 to the stem 35 of camming member 16. O-rings as indicated illustratively at 36 are provided for sealing all operatively engaged surfaces to make the inner volumes as shown in FIG. 1 airtight.

In this manner, when an article 10 is placed in the collet and forced to the left as shown in FIG. 1, the collet and housing 19 move to the left with respect to camming member 16, effecting the necessary camming action, to securely hold the article in the chuck. Air is vented into the system through a passage or hose 37 (illustrated schematically in phantom-line) extending through the spindle and coupled out of the spindle through a universal connector (not shown), and passages 38 and 39, permitting the necessary axial displacement between camming member 16 and housing 19. Advantageously, air pressure may be applied through passage 37 to forcibly augment the gripping force applied to the article. This causes the internal volume indicated at 41 to decrease, venting air out through hose coupling 40.

After the torquing operation, in order to unlock the collet from the article 10 without damaging either, compressed air is fed through a flexible hose (not shown) and through coupling 40 into interior volume 41, forcing housing 19 to the right relative to camming member 16 and thereby returning the collet to its original position.

Inner closure member 33 and intermediate closure member 32 are joined by low-friction bearings 42, and are assembled with an interference fit to prevent relative axial movement between the two closure members. This permits the intermediate closure member, to which coupling 40 is attached, to remain stationary while the inner closure member rotates with camming member stem 35, without unduly loading the drive spindle 29. A bearing surface 43 allows axial and rotational motion of cylindrical wall 30 relative to intermediate closure member 32. Alternatively, mechanical or other appropriate unlocking means may be provided.

It will be apparent to those familiar with the art that various modifications and changes may be made to the above-described embodiments without departing from the scope of the invention which is limited solely in accordance with the following claims.

We claim:

1. A collet for applying high levels of torque to an article having substantially circular cross-sections about a common axis and sloping sides, without marring the exterior of the article, comprising in combination:
   (a) a deformable plastic frustum-shaped body comprised of rubber or an equivalent resilient material, forming a non-marring continuous interior surface lining for gripping such article substantially conforming to the exterior surface of such article about an axis of rotation corresponding to the geometrical axis of such article; and
   (b) a plurality of rigid, axially and radially extending reinforcing members embedded in and distributed circumferentially about said body, the exterior surfaces of said reinforcing members extending beyond the exterior surface of said body for collectively defining a conical camming surface, and each of said reinforcing members forming an interior bearing surface substantially conforming to and within the interior surface of said body over the axial extent thereof for transmitting radial forces applied at its exterior surface to such article through the medium of the body while resisting torsional distortion of the body, said reinforcing members being T-shaped in cross-section with the head of the T forming the bearing surface.

2. The collet as defined in claim 1 wherein the said body has a shore "A" hardness between about 40 and 95.

3. A collet as defined in claim 2 wherein the body has a Shore "A" hardness between about 65 and 90.

4. An apparatus for applying high levels of torque to an article having substantially circular cross-sections about a common axis and sloping sides, without marring the exterior of such article, comprising in combination:
   (a) the collet of claim 1, and
   (b) a chuck for said collet including camming means forming an interior frusto-conical cam surface for engaging the camming surface defined by the reinforcing members of said collet, and means for preventing relative rotation between the camming means and the collet while permitting axial movement between them.

5. An apparatus for applying high levels of torque to an article having substantially circular cross-sections about a common axis and sloping sides, without marring the exterior of such article, comprising in combination:
   (a) the collet of claim 1, and
   (b) a chuck for mounting said collet, including (i) a camming member having a frusto-conical interior cam surface extending longitudinally from one end thereof corresponding to the camming surface defined by the reinforcing members of the collet, and (ii) a cap-member axially slideably engaged with and locked against rotation with respect to the camming member, and including means attaching the cap-member to the collet so as to permit entry of such article into the collet, whereby axial force applied to the collet with respect to the camming member causes the latter to cam the reinforcing members of the collet radially inward, tightly and uniformly gripping such article against relative rotation with respect to the chuck.

6. Apparatus as defined in claim 5 including unlocking means for forcing the collet and camming member apart to release such article from the collet.

7. Apparatus as defined in claim 6 including locking means for forcing the collet into the camming member to grip such article in the collet.

* * * * *